June 3, 1930.  W. B. STOUT  1,760,890
AIRPLANE LANDING GEAR
Original Filed July 11, 1925   3 Sheets-Sheet 1
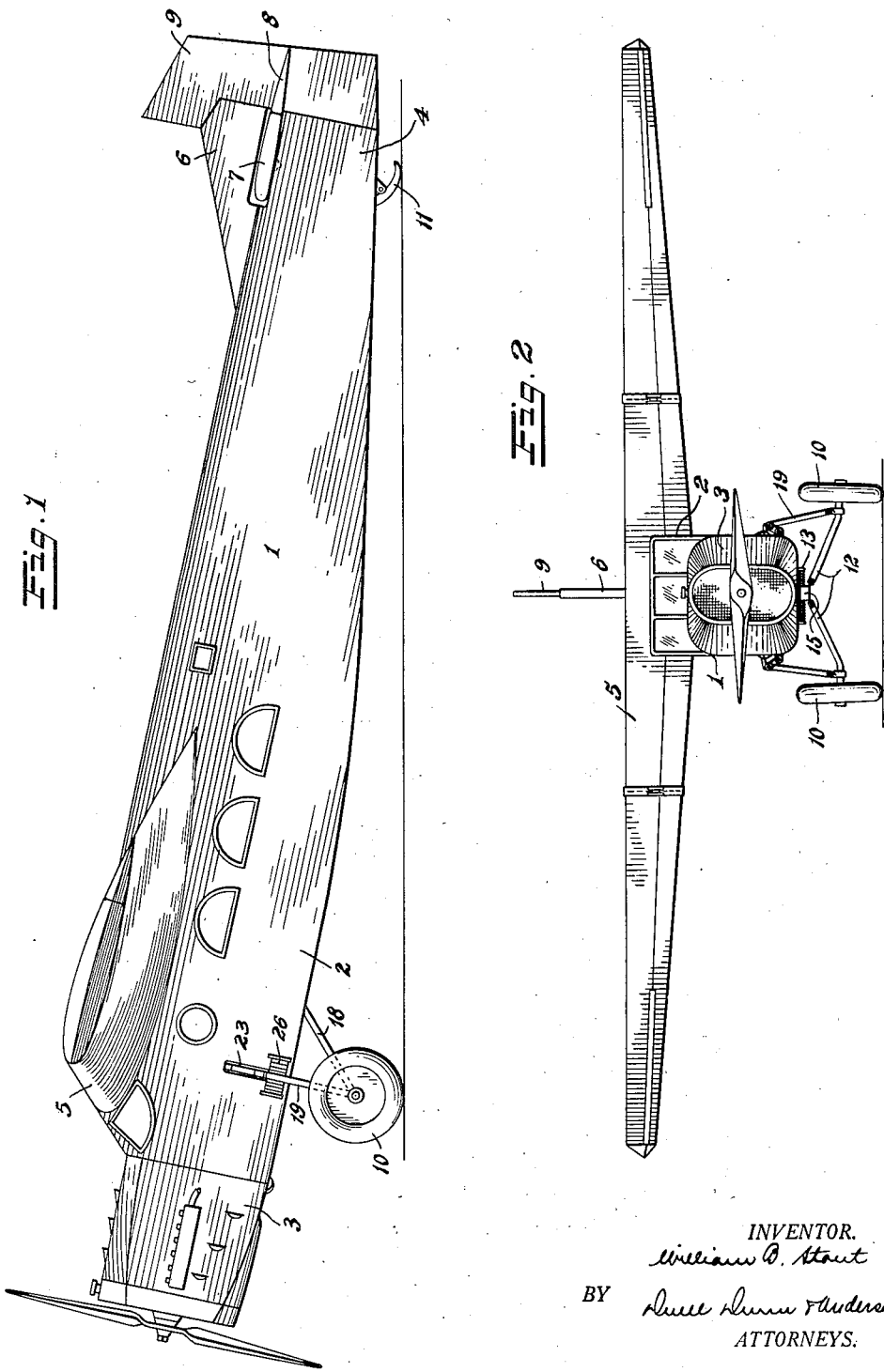
INVENTOR.
William B. Stout
BY
ATTORNEYS.

June 3, 1930. W. B. STOUT 1,760,890
AIRPLANE LANDING GEAR
Original Filed July 11, 1925  3 Sheets-Sheet 2
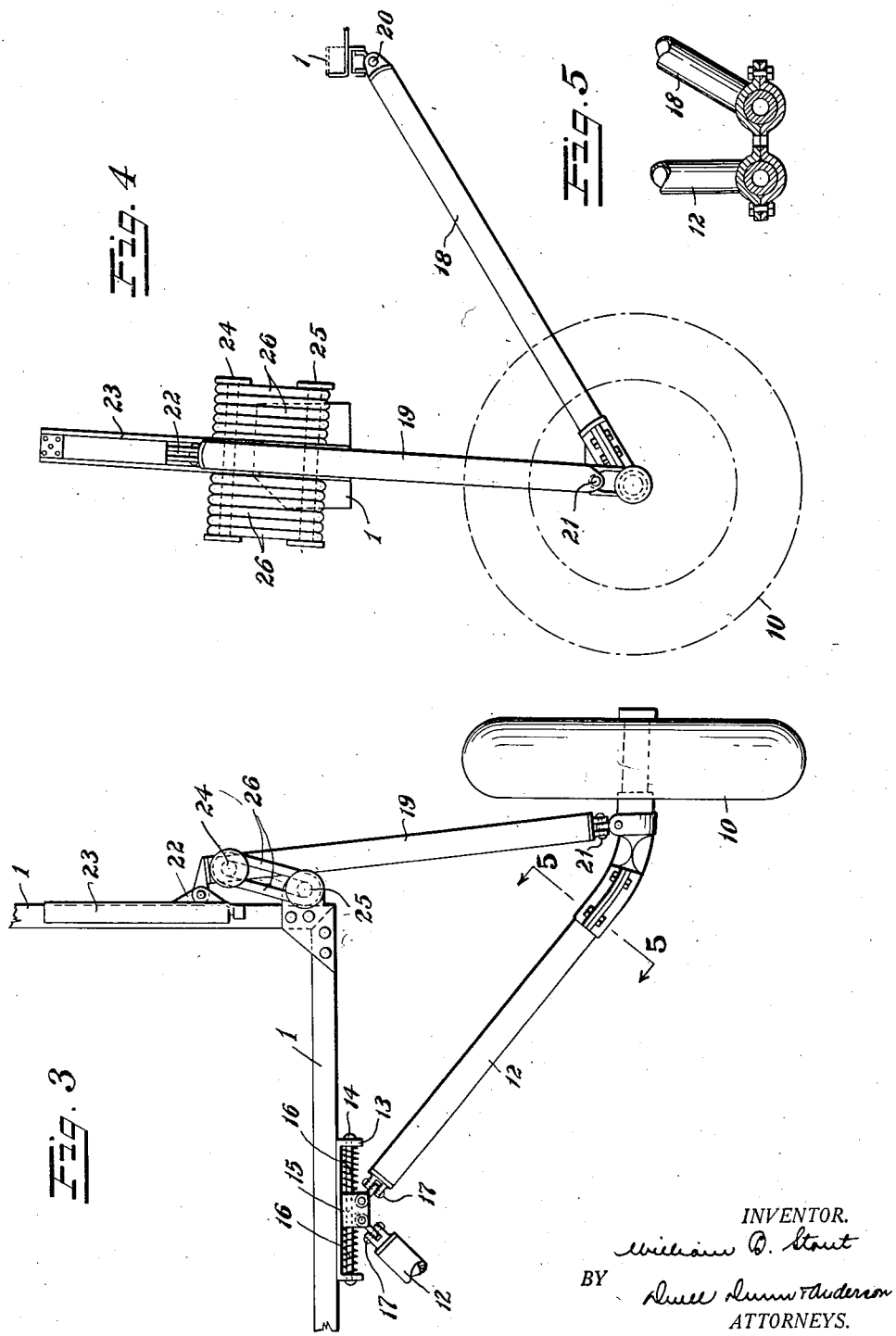
INVENTOR.
William B. Stout
BY
ATTORNEYS.

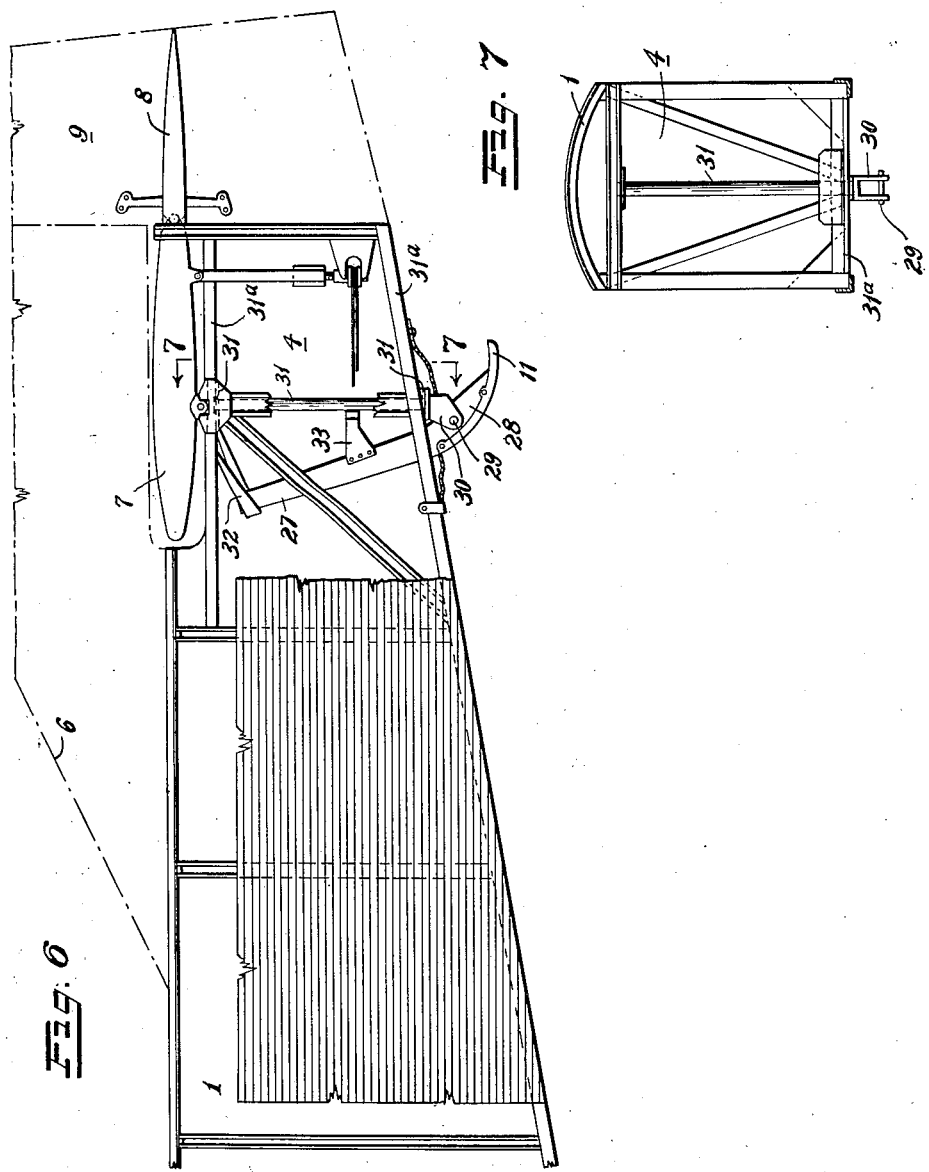

Patented June 3, 1930

1,760,890

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE LANDING GEAR

Original application filed July 11, 1925, Serial No. 42,944. Divided and this application filed October 5, 1926. Serial No. 139,592.

This invention relates to airplanes and more particularly to the landing gear therefor.

This application is a division of my co-pending application, Serial No. 42,944, filed July 11, 1925.

It is an object of the invention to provide a landing gear, the parts of which will be relatively few in number and individually rugged in construction, these parts being readily assembled with respect to each other and associated with the fuselage of an airplane to render efficient service as a landing gear over long periods of time with freedom from mechanical difficulty.

Another object is that of constructing a landing gear which will operate efficiently to cushion shocks and prevent undue strain being thrown upon the structure which it is supporting, when the ship is taxiing, so that even when it is passing over rough ground, the liability of damage to the fuselage and associated structure will be reduced to a minimum, aside from the fact that discomfort to the occupants of the ship will likewise be avoided to a maximum extent.

Still another object is that of furnishing a landing gear particularly adapted for use in connection with airplanes, but not necessarily limited to this particular association, and which gear will operate efficiently irrespective of whether the ship be loaded to capacity or not.

An additional object is that of constructing a mechanism of this type which will automatically adapt itself, in the event of a poor landing being made, in order to reduce to a minimum the probability of injury to the occupants of the airplane, or damage to the ship.

It is a further object of the invention to provide a landing gear which will better absorb the shock of the plane when landing under practically any and all conditions and which will resist shock and strain from substantially any direction.

For a fuller understanding of the nature and objects of the invention reference should be had to the following detailed description taken in connection with the accompanying drawing, in which:

Figure 1 is a side elevation of an airplane embodying this invention;

Fig. 2 is a front elevation of the complete airplane showing the relation of the landing gear to the plane;

Fig. 3 is a front elevation of one form of under-carriage;

Fig. 4 is a side elevation of the same;

Fig. 5 is a detail section on the line 5—5 of Fig. 3;

Fig. 6 is a fragmental side elevation of the empennage, the outer covering being broken away to show the tail skid, and Fig. 7 is a cross section fuselage frame on the line 7—7 of Fig. 6.

The plane comprises generally a fuselage 1, having a cabin compartment 2, a power section 3, and empennage 4. To the fuselage is attached the wing 5, stabilizer 6—7, elevator 8, and rudder 9.

The foregoing is a general description of the type of plane described in the aforesaid parent application, and with which the landing gear herein referred to is especially intended to be used, but it will be clear that the invention hereinafter to be described may also be used with any type of aircraft to which it is adaptable.

In the embodiment illustrated the plane has been shown as a land ship. Thus, the landing gear includes wheels 10 and a tail skid 11. At this time it is to be understood, while a landing gear embodying the features of the present invention is particularly valuable in a land machine that, in lieu of wheels any desired fuselage- or body-supporting elements might be employed. Therefore, in the following description, where the expression "wheels" occurs, this is to be interpreted in a general sense.

The landing gear comprises a pair of arms 12 having their upper ends connected as, for example, by universal joints 17 to a block 15. This block is mounted for movement transversely of the fuselage 1 by having the same slidably disposed upon a rod 14 supported by a bracket 13. With a view to normally maintaining the ends of the arms equi-distant from the center of gravity of the plane and also, in order to cushion any side thrusts imparted to the landing gear, cushioning elements such as springs 16 are, in the embodiment illustrated, interposed between the block 15 and the ends of the bracket 13.

The wheels or other supporting medium are secured to the outer and lower ends of the arms 12, and bracket portions (as shown in Figure 5) are associated with the arms and serve to secure thereto the lower ends of braces 18, the bodies of which are inclined upwardly and rearwardly, their upper ends being attached to the fuselage as at 20, it being observed that this connection also permits a somewhat universal movement on the part of each brace. Attached adjacent the outer ends of the arms 12 are the lower ends of struts 19, these struts having their bodies inclined inwardly and upwardly and the connection at their lower ends being established, preferably, in each instance, by a universal joint 21.

At their upper ends each of these struts has sliding connection with the fuselage, preferably by being pivotally secured to a block 22 sliding in a vertical guide or track 23 associated with, or forming a part of the fuselage, it being thus obvious that the upper ends of these struts, in their movement with respect to the plane body, will be guided, and that the proper relative positions of the outer arm ends will, at all times, be maintained during such movements.

In order to cushion shocks imparted to the struts and, furthermore, with a view to resisting the upward movement thereof with respect to the fuselage, it is preferred that a shock absorbing structure be provided. This structure may include, on each side of the fuselage, a rod 24 which is rigidly attached to the upper end of the strut, and a second rod 25 likewise secured to the fuselage, an elastic fabric or plurality of strands 20 encircling these rods and serving normally to maintain them in positions adjacent each other.

The tail skid, generally indicated at 11, may be modified in numerous aspects according to the type of plane with which it is associated. However, in the embodiment illustrated it will be noted that this member embraces an inclined bar 27 terminating in a shoe 28 and being pivotally mounted, as at 29, by a bracket 30. This bracket is vertically journalled in a post structure 31 carried by framing 31ª. Movement of the bar 27 beyond the position shown in Figure 6 is prevented as, for example, by a stop member 33. Movements of the upper end of the bar forward of such position are cushioned, preferably by utilizing a band 32 of elastic fabric, it being obvious that any strains in a rearward direction against the shoe portion 28 will result in a forward swinging of the upper end of the bar 27, which will be yieldingly resisted by the element 32.

As a consequence, all normal shocks occurring adjacent the rear end of the plane during taxiing, taking off and landing, will be absorbed to the greatest extent, and in this connection it will be obvious, due to the manner of mounting the bar 27, that the shoe portion thereof will be mobile, i. e., will swing to both sides of the post, so that the plane may be swung freely and will accordingly have an extremely small turning radius, aside from the fact that less power will be required for effecting such turning.

As regards that portion of the landing gear involving the construction 10 to 26, it will be appreciated that it is capable of resisting all the normal strains incident to usage, without transmitting damaging shocks to the plane. All vertical, or substantially vertical shocks will be taken up by the cushioning and connecting element 26, while side thrusts will be taken up by the springs 16. In this connection it is to be understood, due to the arms 12 being connected to each other, that even if a poor landing should be made and one of the wheels, or other supporting elements, contacted with the ground prior to contact being established between the ground and the other supporting element, that the latter would be swung to shift with respect to the center of gravity of the plane. Thus, as the fuselage would rock axially and the second wheel, or supporting element, would come into contact with the ground, the resultant jar and possibility of damage would be reduced to a minimum.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an airplane, a landing gear, means for connecting said gear to the fuselage, including a strut extending laterally from said wheels, a strut extending substantially vertical therefrom and means for resiliently connecting each of said struts to the fuselage, said connection including a pivot for one of said struts and means associated with the other of said struts for swinging said wheel about said pivot to retract the landing gear.

2. A landing gear including, in combination, a fuselage, guides extending upwardly along said fuselage, struts having their upper ends slidable within said guides, arms connected to each other adjacent their inner ends and connected adjacent their outer ends to the lower ends of said struts, a guide extending transversely of said fuselage and connected to the inner ends of said arms to permit sliding movement of the latter with respect to said fuselage, and brace members having their inner ends connected to said fuselage, their outer ends being connected to said arms and struts adjacent the lower ends of the latter.

3. A landing gear including, in combination, a fuselage, guides extending upwardly along said fuselage, struts having their upper ends slidable within said guides, arms connected to each other adjacent their inner ends and connected adjacent their outer ends to the lower ends of said struts, a guide extending transversely of said fuselage and connected to the inner ends of said arms to permit sliding movement of the latter with respect to said fuselage, brace members having their inner ends connected to said fuselage, their outer ends being connected to said arms and struts adjacent the lower ends of the latter, and means disposed adjacent said guides and yieldingly resisting movements of said arms and struts.

In testimony whereof I affix my signature.

WILLIAM B. STOUT.